UNITED STATES PATENT OFFICE.

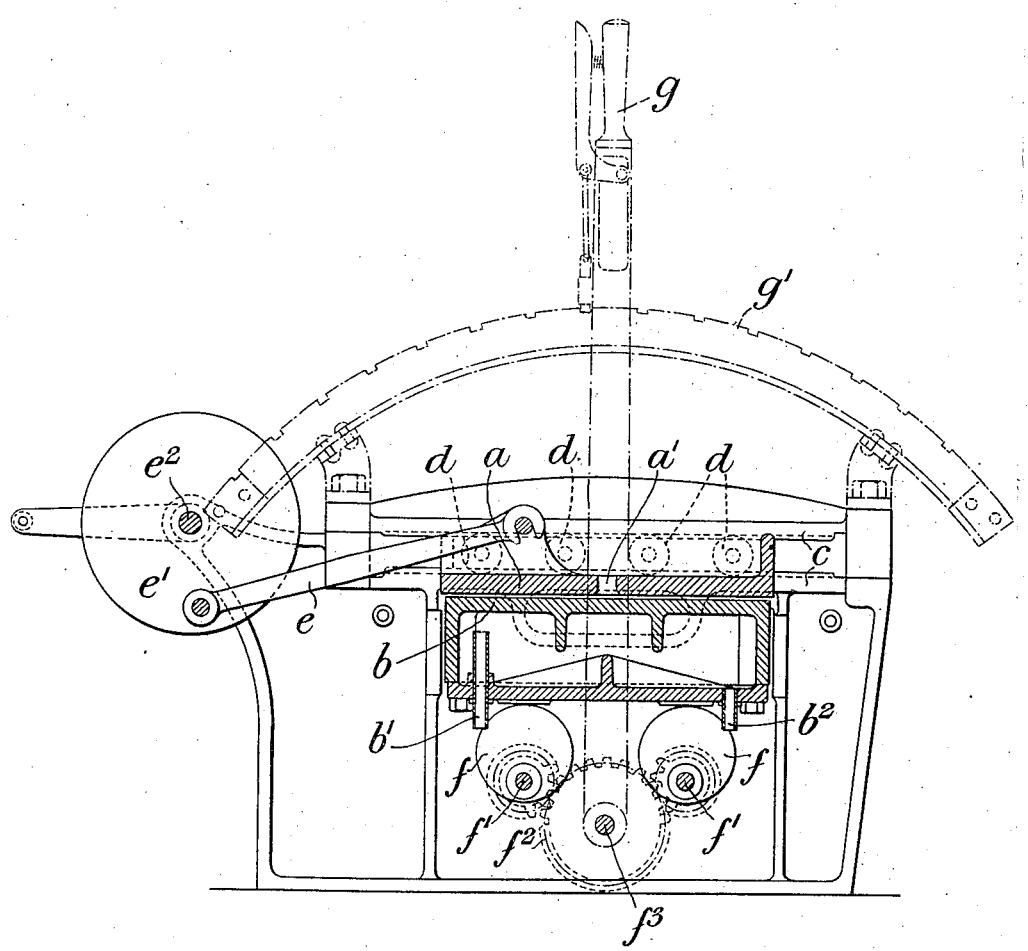

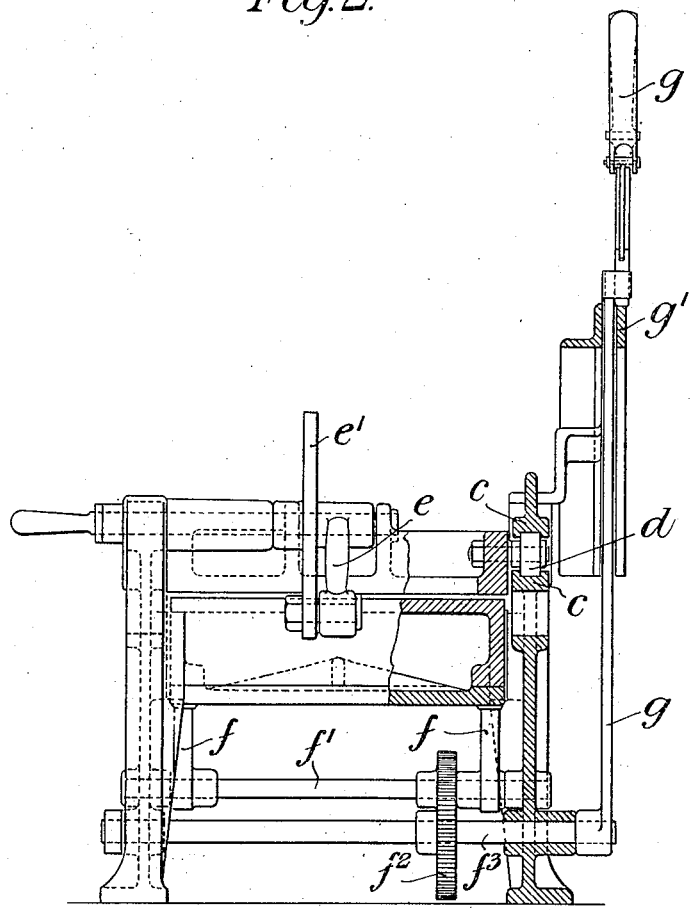

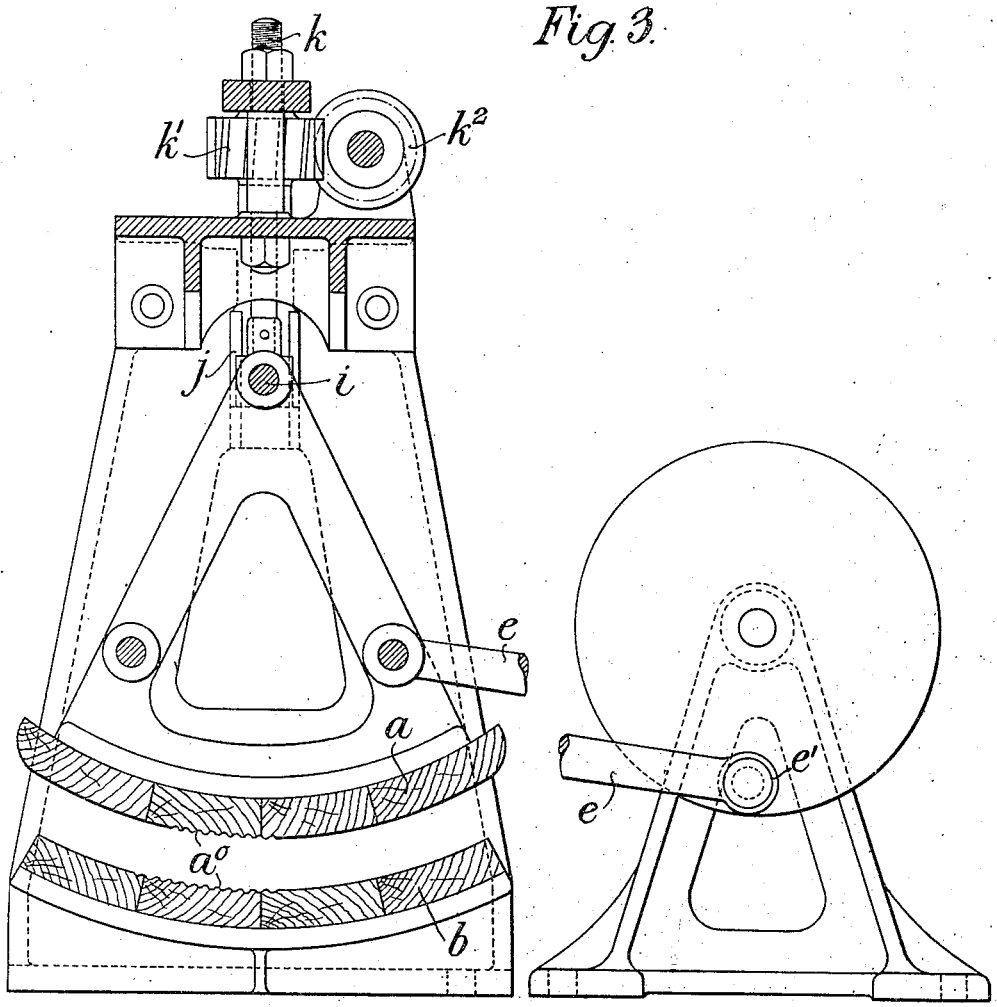

SAMUEL CLELAND DAVIDSON, OF BELFAST, IRELAND.

MACHINERY FOR RUBBER AND THE LIKE.

1,287,253.   Specification of Letters Patent.   Patented Dec. 10, 1918.

Application filed March 30, 1916. Serial No. 87,832.

*To all whom it may concern:*

Be it known that I, SAMUEL CLELAND DAVIDSON, subject of the King of Great Britain and Ireland, of Sirocco Engineering Works, Belfast, Ireland, merchant, have invented certain new and useful Improvements in or Relating to Machinery for Rubber and the like, of which the following is a specification.

This invention relates to machinery for rubber and the like, and has for its object to provide an improved apparatus and means for manipulating the rubber, and comprises certain modifications of the invention described in my application for patent, Serial No. 32,587, filed June 7th, 1915.

The herein described apparatus is more particularly applicable for treating rubber recently coagulated from the fluid latex, and is also applicable to the treatment of other plastic substances having similar or like characteristics to those of rubber.

The said apparatus has a similar operative effect upon the rubber being manipulated to that described in my prior application for patent, Serial No. 32587, filed June 7th 1915, wherein the rubber is kneaded by rolling under pressure a mass of the same over and over upon itself, the present apparatus being constructional modifications of the apparatus described in the said prior application.

According to the present invention, the apparatus may consist of flat or curved parallel or substantially parallel surfaces adapted to be moved the one over the other so as to knead the rubber between opposing surfaces, one or both of which may be heated by steam, hot water, or other suitable medium, and the motion may be either to and fro or continuous.

In one such construction, I employ two flat surfaces, the upper one, for example, being reciprocated over the lower surface which may be raised or lowered for exerting the required pressure to effect the kneading operation, means being provided for placing the mass of rubber to be treated in position, and for removing the same.

In another form the surface of the reciprocating member may be cylindrical, or curved, so as to oscillate upon its center and move to and fro over a corresponding or similarly curved parallel or substantially parallel surface, means being provided for moving the co-acting surfaces together, and for separating them as required, so as to apply the necessary pressure upon the rubber being kneaded between them.

In all the said modified constructions the members may be moved sufficiently apart to provide a large enough opening for inserting the rubber, or a suitable arrangement of doors may be provided for this purpose. The co-acting surfaces between which the rubber is kneaded may be heated in any suitable manner.

The rubber to be manipulated may after coagulation be at once subjected to said kneading treatment, but preferably is first immersed for a time in boiling water or other washing fluid, and may be boiled before being thus dealt with.

The accompanying drawings illustrate two constructions made in accordance with the present invention.

Figure 1 is a sectional side elevation, and Fig. 2 an end view partly in section showing one construction where two flat surfaces are employed, one of which has horizontal to and fro movement, and the other a vertical up and down motion to enhance or release the pressure on the rubber between the two co-acting surfaces.

Fig. 3 is a section of a construction where curved surfaces are employed, one or other of which has a vertical up and down motion, and in which the upper surface has a pendulum to and fro motion.

Referring to Figs. 1 and 2, in the construction here shown the rubber is kneaded between the opposing flat surfaces of two members $a$ and $b$, the upper member $a$ is reciprocated in suitable guides $c$ and for this purpose is provided with rollers $d$ running in the said guides. The reciprocating motion is preferably obtained by a connecting rod $e$ and crank $e'$ driven from a suitable hand or power driven shaft $e^2$ at the end of the machine. The lower member $b$ of the table is adapted to be raised and lowered so as to press the mass of rubber under treatment between the surfaces of $a$ and $b$ for which purpose the table $b$ is supported on eccentric disks $f f$ mounted on shafts $f'$, and operated by gearing $f^2$ from a shaft $f^3$, the shaft $f^3$ being adapted to receive a part rotation by a hand lever $g$ working over quadrant $g'$ provided with notches and suitable locking devices as shown for securing the handle in the position to which it is moved thereby maintaining the pressure which has been put upon the material between the operative surfaces of the members $a$ and $b$. The lower member $b$ is made hollow as shown so as to be suitably heated by steam or hot water, or other suitable fluid, and pipes $b^1$ $b^2$ are shown for the purpose of providing an inlet and outlet respectively for the heating fluid, flexible connections being preferably provided so as to accommodate the connections to the slight rising and falling movement of the table.

The upper reciprocating member $a$ is provided with a slot $a'$ substantially in the center thereof for the purpose of introducing the rubber to be treated, means may however be provided for inserting and removing the rubber in other suitable manner.

In operation, the rubber or other material to be treated is inserted through an aperture $a'$ on to the table $b$ beneath. Reciprocating motion is imparted to the member $a$ and pressure is put upon the material under treatment by pulling over the handle $g$ until the cams $f$ have raised the table $b$ to exercise the required pressure on the material between the opposing surfaces $a$ and $b$, which pressure may be increased and altered from time to time as may be required. When the kneading operation is completed the handle $g$ is returned to the off position, thereby lowering the member $b$ and releasing the material, which may be removed through the aperture $a'$ or in other suitable manner.

In the construction shown in Fig. 3 the surfaces of the members $a$ and $b$ are suitably curved, the upper member $a$ being reciprocated as before, but, in this case, it is conveniently mounted on a shaft $i$ and oscillated back and forth thereon by a connecting rod $e$ and crank $e'$, which may be driven by hand, or alternatively by a pulley and belt or other suitable device. For the purpose of exerting pressure on the material between the surfaces $a$ and $b$, the shaft $i$ is carried in sliding bearings $j$ adapted to be raised and lowered by the vertical screws $k$ working in suitable nuts $k'$ provided with teeth and gearing with the worm wheel $k^2$. The coacting surfaces of the curved members may be partly corrugated as at $a$ if required. The operation is similar to that employed with the construction shown in Fig. 1 except that the material is more conveniently placed in at the end of the machine between the members $a$ and $b$, the co-acting surfaces of which are shown of wood, but the surface $b$ may be of metal with a hollow chamber beneath as in $b$ of Figs. 1 and 2, for a heating medium such as steam or hot water, for the same object as described in reference to Figs. 1 and 2.

I claim:—

1. In kneading rubber or the like, an apparatus consisting of opposing parallel surfaces and means for producing relative reciprocating movements so that one surface travels in a plane substantially parallel to the other surface, whereby the material is rolled over and over on itself between the opposing surfaces and kneaded thereby.

2. For kneading rubber, an apparatus consisting of opposing parallel surfaces, and means for producing relative reciprocating motion thereof, so that one surface travels in a plane substantially parallel to the other surface, in combination with means for moving said surfaces nearer to, or farther from, one another, in order to vary the pressure on the material, and thereby cause it to roll over and over upon itself between the opposing surfaces, whereby the required kneading effects are obtained.

In witness whereof I have hereunto signed my name in the presence of two subscribing witnesses.

SAMUEL CLELAND DAVIDSON.

Witnesses:
 GEROGE G. WARD,
 HUGH T. COULTER.